United States Patent [19]
Isaka et al.

[11] Patent Number: 5,594,602
[45] Date of Patent: Jan. 14, 1997

[54] TRACKING ERROR DETECTING CIRCUIT

[75] Inventors: Haruo Isaka, Yawata; Toshihiko Maruoka, Ikeda; Kei Ichikawa, Osaka; Kenichi Honjo, Kobe; Makoto Gotou, Nishinomiya, all of Japan

[73] Assignee: Matsushita Electric Industrial Co., Ltd., Osaka, Japan

[21] Appl. No.: 286,201

[22] Filed: Aug. 5, 1994

[30] Foreign Application Priority Data

Aug. 11, 1993 [JP] Japan .................................. 5-199341
Aug. 24, 1993 [JP] Japan .................................. 5-209348

[51] Int. Cl.$^6$ .............................. G11B 5/584; G11B 5/58
[52] U.S. Cl. ............................ 360/77.14; 360/77.01
[58] Field of Search ............................ 360/77.14, 77.06, 360/77.15, 77.01

[56] References Cited

U.S. PATENT DOCUMENTS 4,991,035 2/1991 Taki .................................. 360/77.15 X Primary Examiner—Andrew L. Sniezek
Assistant Examiner—Regina Y. Neal
Attorney, Agent, or Firm—Wenderoth, Lind & Ponack

[57] ABSTRACT

A tracking error detecting circuit is used in a magnetic reproducing apparatus for reproducing an information signal from tracks which are formed on a magnetic tape obliquely in a longitudinal direction of the magnetic tape. The tracks have selectively recorded thereon a pilot signal multiplexed with the information signal. The tracking error detecting circuit comprises: a rotating magnetic head scanning the tracks for reproducing the information signal on which the pilot signal is selectively multiplexed to obtain a reproduced signal; a comparator for comparing a level of the reproduced signal with a specified level and for issuing a binary signal representing a comparison result; and a level detecting circuit for detecting a level of the pilot signal contained in the reproduced signal from an output of the comparator.

9 Claims, 9 Drawing Sheets

TRACKING ERROR DETECTING CIRCUIT

BACKGROUND OF THE INVENTION

1. Field of the Invention

The present invention relates to a tracking error detecting circuit of a magnetic recording and reproducing apparatus using pilot signals.

2. Description of the Prior Art

As one of tracking control methods of a helical scan type magnetic recording and reproducing apparatus, it is known to record pilot signals and information signals in multiplex, and reproduce the information signals while controlling a running of a magnetic tape or driving a head in a track widthwise direction by using the reproduced pilot signal, thereby keeping relative configuration of the head and a track normal.

A conventional tracking control method used in an 8 mm format VCR (video cassette recorder) or the like is described below. In the track recorded on the magnetic tape of such a VCR, aside from information signals such as video signals, four kinds of pilot signals for tracking f1 to f4 are recorded in multiplex by repeating sequentially in every track. Supposing a horizontal synchronous signal frequency to be fh, a frequency difference between tracks of the pilot signals is selected to be fh and 3fh. More specifically, f1=6.5 fh, f2=7.5 fh, f3=10.5 fh, and f4=9.5 fh. While the head is scanning on a main track in which a pilot signal f2 is recorded, the reproduced signal from the head wider than a track width is mixed with crosstalk pilot signals f1=6.5 fh, f3=10.5 fh from both adjacent tracks. Therefore, when the reproduced signal is multiplied by a reference signal 7.5 fh at the same frequency as the pilot signal f2 of the main track in a multiplying circuit, pilot components from the both adjacent tracks are transformed into beat components at frequencies of fh and 3fh, respectively, and therefore by detecting and comparing individual amplitude levels, it is known which one of right and left adjacent tracks is mixed more, that is, the head is deviated to right or left. Actually, the reproduced signal is multiplied by reference signals, which have frequencies equivalent to f1 to f4, from a reference signal generating circuit sequentially in the multiplying circuit. From outputs of the multiplying circuit, the fh component is detected by a first band pass filter having its center at fh and a first amplitude detecting circuit for detecting its output level, and the 3fh component is detected by a second band pass filter having its center at 3fh and a second amplitude detecting circuit, and a level difference between the fh component and the 3fh component is detected by a differential circuit. Therefore, an output of the differential circuit is relative configuration of the head and the main track, that is, a tracking error signal. The obtained tracking error signals differ in polarity in every scan, and is aligned in the polarity by a head changeover signal and is added to a capstan control circuit. The capstan control circuit drives a capstan motor, and controls a tape speed, thereby keeping correct the relative configuration of the head and the main track.

For example, similar techniques are disclosed in the U.S. Pat. Nos. 5,126,892, 5,182,681, 5,003,413, etc.

In such constitution, however, a reproduction level of the pilot signal varies significantly, not only by a tracking error, but also by reproduction sensitivity fluctuations including equivalent reactance of the head, transmission characteristic of rotary transformer, and gain of a head amplifier. Accordingly, control performance deteriorates, and an error detection circuit requires an automatic gain control circuit for varying a detection gain depending on the reproduction level of the head.

SUMMARY OF THE INVENTION

In the light of the above problems, it is a primary object of the invention to present a tracking error detecting circuit of a simple constitution capable of assuring the reproduction sensitivity of a head and the like regardless of the tracking error detection gain, which is easy to be digitized and integrated in circuit.

To achieve the object, the tracking error detecting circuit of the invention is used in a magnetic reproducing apparatus for reproducing an information signal from tracks which are formed on a magnetic tape obliquely in a longitudinal direction of the magnetic tape, the tracks having selectively recorded thereon a pilot signal multiplexed with the information signal, and comprises a rotating magnetic head scanning the tracks for reproducing the information signal on which the pilot signal is selectively multiplexed to obtain a reproduced signal, a comparator for comparing a level of the reproduced signal with a specific level and for issuing a binary signal representing a comparison result, and a level detecting circuit for detecting a level of the pilot signal contained in the reproduced signal from an output of the comparator.

The invention, thus constituted, transforms the reproduced signal into two levels in a comparator, and detects the level of the pilot, and hence presents a tracking error detecting circuit that is not affected by a reproduction level. Being transformed into binary values in the comparator, expensive AD (analog/digital) converter for digitizing is not needed, and a tracking error detecting circuit that can be easily integrated in circuit is presented.

DESCRIPTION OF THE PREFERRED EMBODIMENTS

Figure 1:
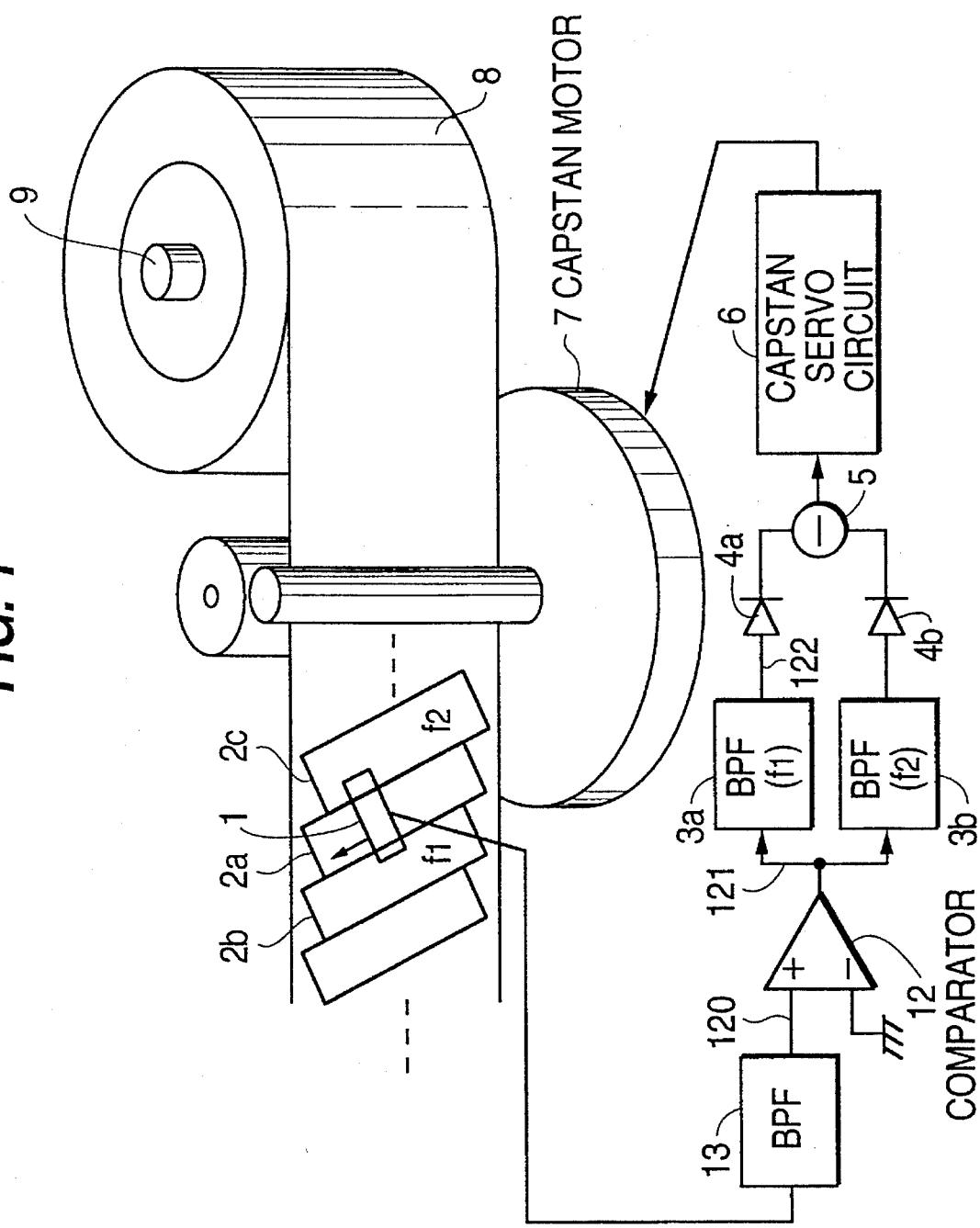
FIG. 1 is a structural diagram of tracking control system comprising a tracking error detecting circuit in a first embodiment of the invention.

Referring now to the drawings, embodiments of tracking error detecting circuit of the invention are described below.

FIG. 1 is a structural diagram of a tracking control system comprising a tracking error detecting circuit in a first embodiment of the invention. Same as known hitherto, pilot signals and information signals are multiplexed and recorded, and when reproducing, by controlling a running of a magnetic tape or driving a rotating magnetic head in a track widthwise direction by using the reproduced pilot signal, relative configuration of the head and a track is kept normal. In this example, in every other track, pilot signals of two frequencies f1 and f2 are multiplexed alternately. While scanning on an intended main track 2a, an output signal of a rotating magnetic head 1 wider than a track width is mixed with crosstalk pilot signals from both adjacent tracks 2b, 2c. Therefore, by detecting and comparing a crosstalk level of each pilot signal, the relative configuration of the main track 2a and the rotating magnetic head 1 is known.

The output of the rotating magnetic head 1 is fed into a comparator 12 through a band pass filter 13, in which signals other than pilot, for example, majority of information signal components are removed. An output of the comparator 12 is fed into a first band pass filter 3a and a second band pass filter 3b. The first band pass filter 3a and a first amplitude detecting circuit 4a are level detecting circuits for tuning with the frequency f1 of the pilot signal from a left adjacent track and extracting its level. Similarly, the second band pass filter 3b and a second amplitude detecting circuit 4b are level detecting circuits for extracting a level of the pilot signal f2 from a right adjacent track. Therefore, an output of a differential circuit 5 shows a relative configuration of the rotating magnetic head and the main track, that is, a tracking error signal. The tracking error signal is fed into a capstan control circuit 6, drives a capstan motor 7, and is controlled so that the rotating magnetic head may come to a middle of the main track. Reference numeral 8 denotes a magnetic tape, and reference numeral 9 denotes a reel for taking up the magnetic tape.

Figure 2A:
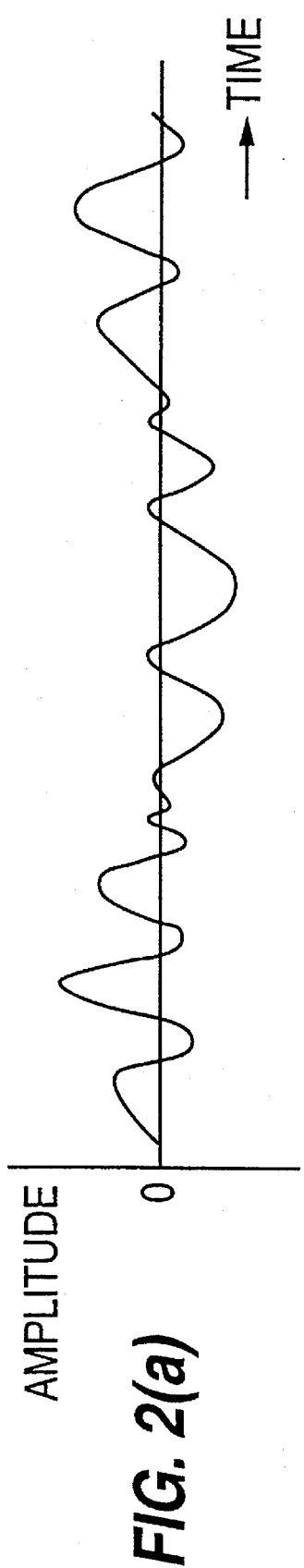
FIG. 2 is a signal waveform diagram of each part in the first embodiment.
Figure 2B:
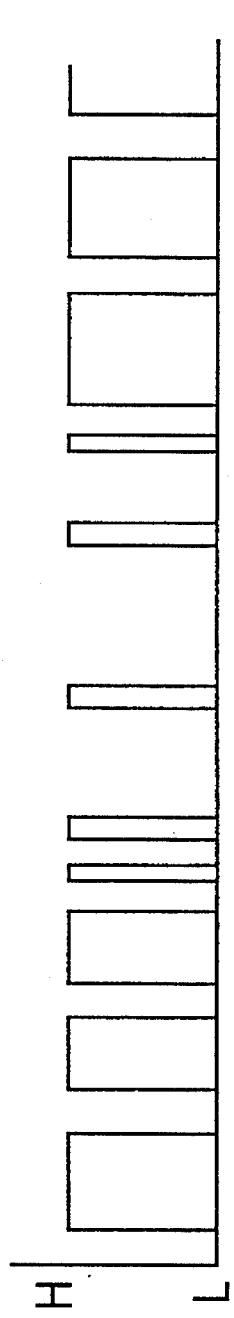
Figure 2C:
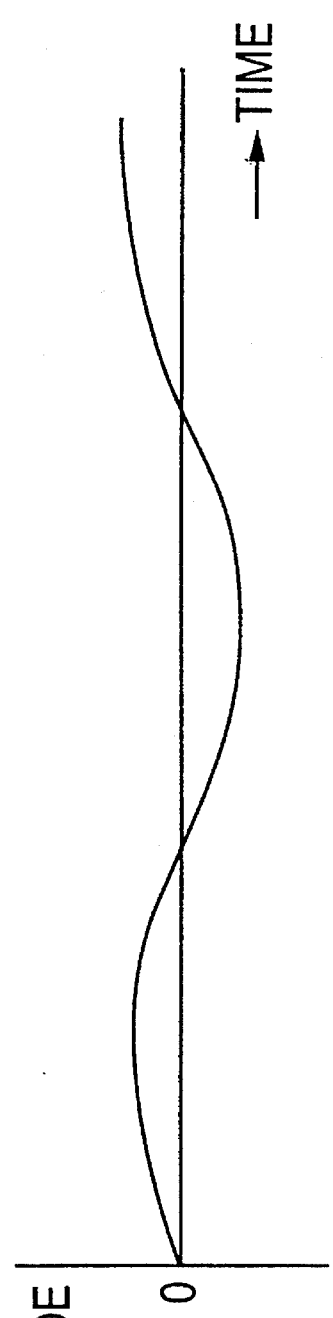
Figure 3A:
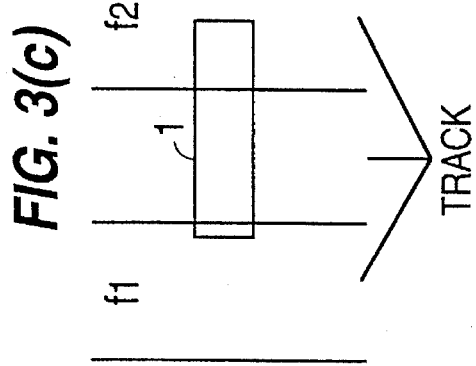
FIG. 3 is a graph showing configuration of a rotating magnetic head and each track and spectrum of comparator inputs at that time.
Figure 3B:
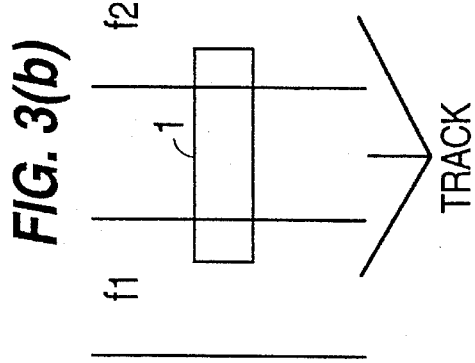
Figure 3C:
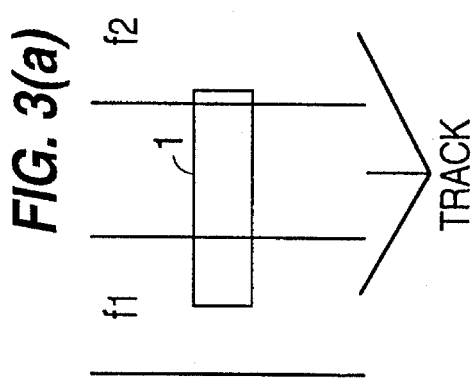
Figure 3D:
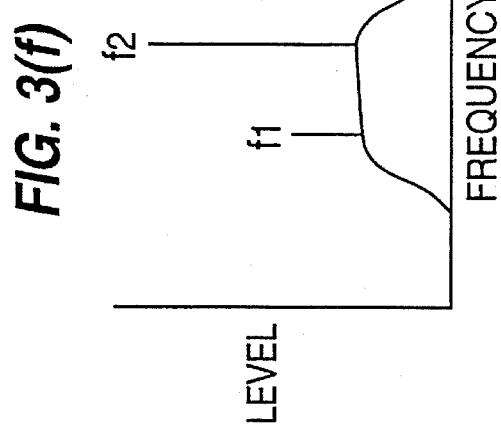
Figure 3E:
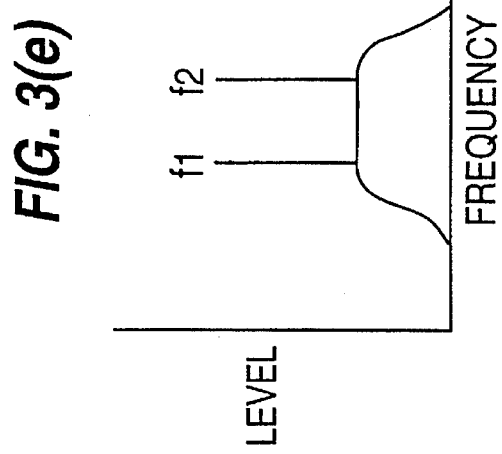
Figure 3F:
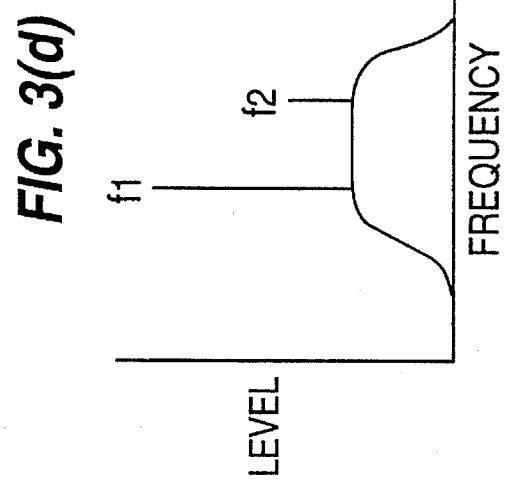

FIG. 2 is a signal waveform diagram of each part FIG. 1. An input signal 120 of the comparator 12 contains, aside from the pilot signals f1, f2, noise as shown in (a) of FIG. 2, such as sliding noise with the tape generated from the rotating magnetic head, amplifier noise from a head amplifier (not shown), and low frequency crosstalk component of the information signals. An output signal 121 of the comparator 12 is H when the input is positive, and L when the input is negative, as shown in (b) of FIG. 2. A signal 122 after passing through a BPF (Band Pass Filter) 3a is a pilot component in the output signal 121 of the comparator 12 as shown in (c) of FIG. 2. Herein, the comparator output undergoes density modulation depending on a magnitude of the pilot component, by the pilot component and said noise components, and therefore output levels of f1 and f2 of the level detecting circuits vary depending on a pilot level of the comparator input.

FIG. 3 shows configuration of the rotating magnetic head and each track, and spectrum of comparator inputs at that time. In (a) of FIG. 3, the head is deviated to the left, the f1 component increases, and the f2 component decreases; in (b) of FIG. 3, the rotating magnetic head is located in the middle of the intended track, and each pilot level is balanced; and in (c) of FIG. 3, the rotating magnetic head is deviated to the right, and the f1 component decreases and the f2 component increases, contrary to (a). That is, it is known that a S/N (signal to noise) ratio of each pilot varies complimentarily by tracking error.

Figure 4:
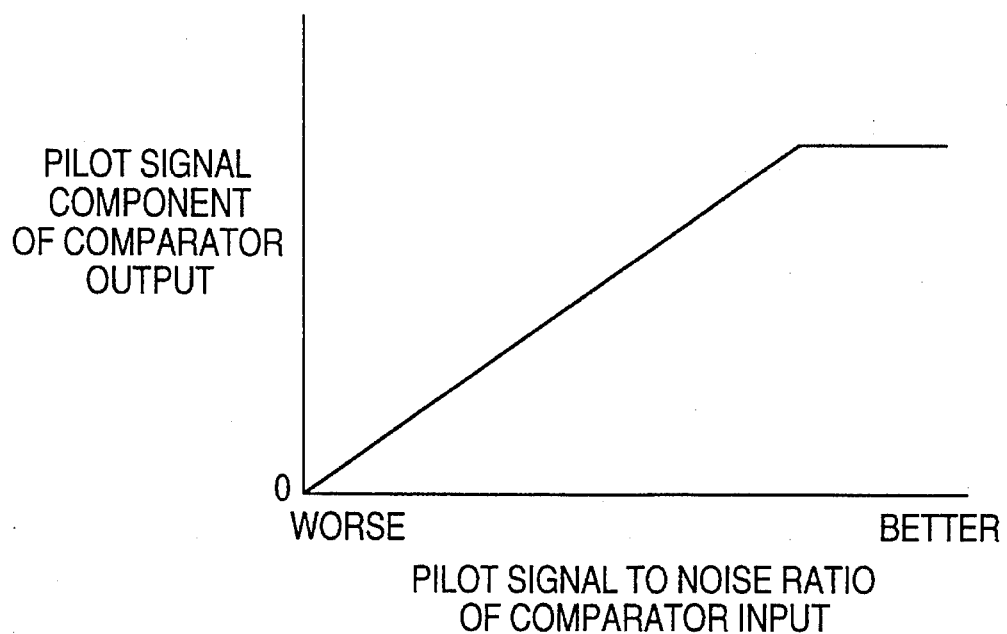
FIG. 4 is a graph showing the relation between pilot S/N ratio of comparator input and pilot signal component of comparator output.

FIG. 4 is a graph showing the relation between the pilot S/N ratio of the comparator input and the pilot signal component of the comparator output. It is known from this graph that the level of the pilot signal component of the comparator output is proportional to the pilot S/N ratio of the comparator input if there is a certain noise. In other words, if there is a certain noise in the comparator input, the tracking error can be detected if the input signal is transformed into binary values of H and L in the comparator. At this time, incidentally, since the comparator output is irrelevant to an input signal level, a detection gain is not affected if a reproduction level from the rotating magnetic head varies.

As the comparator, for example, a limiter circuit for sufficiently amplifying the input signal and limiting an amplitude may be used.

Figure 5:
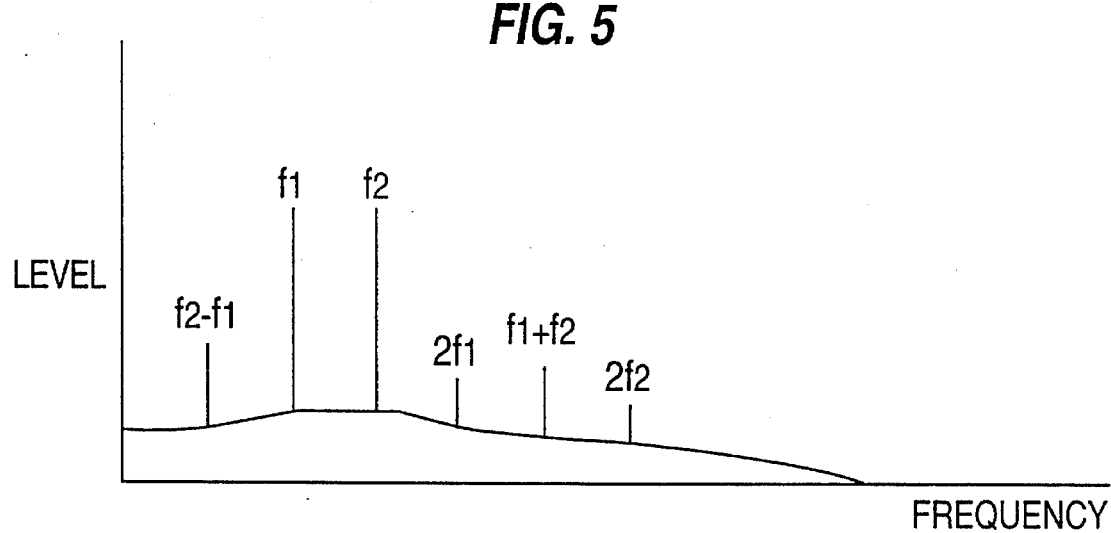
FIG. 5 is a graph showing a frequency spectrum of the comparator output.

FIG. 5 is a graph showing a frequency spectrum of the comparator output. Since an operation of the comparator is nonlinear, generally, harmonic components of the comparator input (2f1, 3f1, ..., 2f2, 2f2, ...) and cross modulation components (f2−f1, f1+f2, 2f1+f2 ...) appear in the comparator output.

Figure 6:
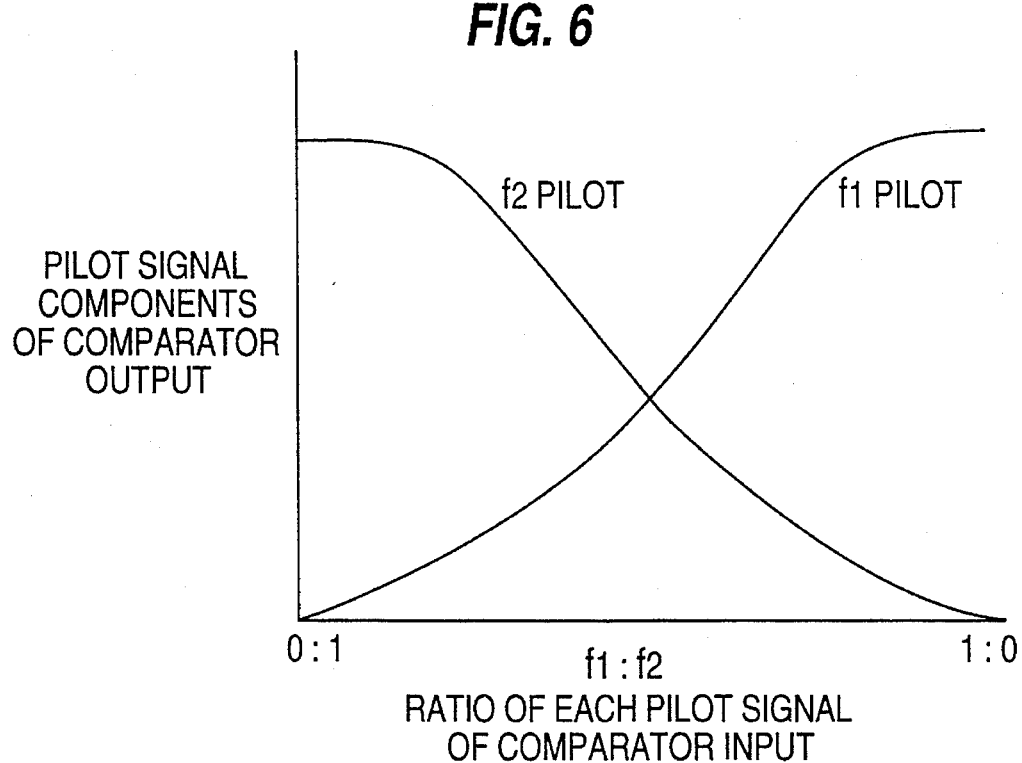
FIG. 6 is a graph showing the relation of ratio of each pilot signal of comparator input and pilot signal component of comparator output.

If noise is not present in the comparator input or is very small, as shown in FIG. 3, the pilot components of the comparator output similarly vary depending on the input level ratio of each pilot since the two pilot signals change complementarily. FIG. 6 is a graph showing a relation of ratio of each pilot signal of the comparator input and pilot signal components of the comparator output. In such as case, too, it is therefore possible to detect the tracking error. Moreover, since the comparator output is determined by the input level ratio of each pilot signal, it is irrelevant to the input signal level same as above, and the detection gain is not changed if the reproduction level from the rotating magnetic head varies.

In the foregoing description, the constitution of the level detecting circuit is not limited to this embodiment alone, but, for example, it may be used as a detecting circuit of synchronous detection type. Besides, by making the comparator output discrete by a proper clock signal, by using a D-flip-flop circuit or the like, the level of the pilot signal can be easily detected in a digital circuit.

Figure 7:
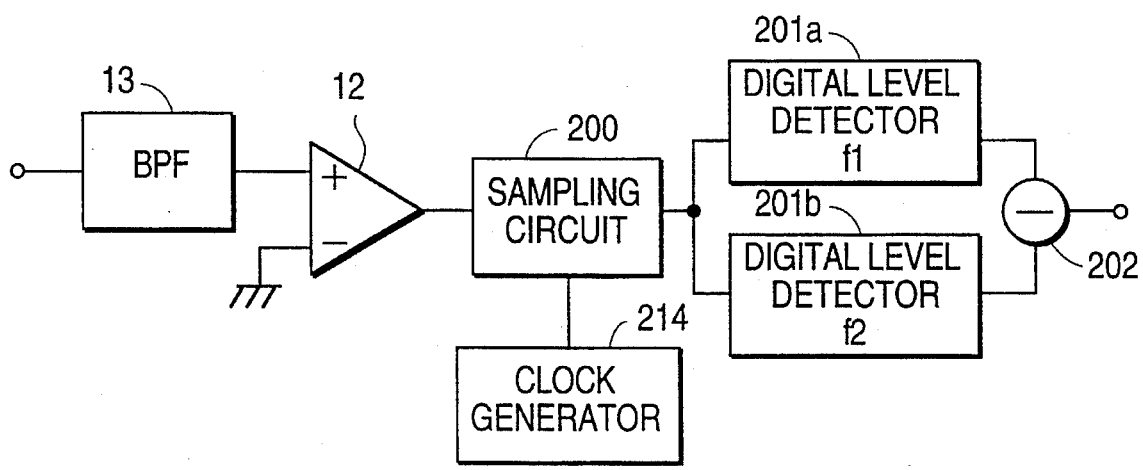
FIG. 7 is a structural diagram of a tracking error detecting circuit in a second embodiment of the invention.

FIG. 7 shows a structural diagram of a tracking error detecting circuit in a second embodiment of the invention.

Constituent elements functioning same as in FIG. 1 are identified with same reference numerals, and their description is omitted.

The signal passing through the band pass filter 13 is transformed into digital signals of H and L in the comparator 12, and is made discrete in a sampling circuit 200. Reference numeral 214 denotes a clock generating circuit for generating a sampling clock. The outputs f1 and f2 of the sampling circuit are fed into digital level detecting circuits 201a, 201b, respectively, the pilot signal components are detected, and their difference is calculated in a differential circuit 202, thereby obtaining a tracking error signal.

A frequency of a sampling clock of the sampling circuit 200 may be selected at a common multiple of each pilot frequency, considering a subsequent processing of level detection. The sampling circuit 200 synchronizes the comparator output by the sampling clock signal merely by using the D-flip-flop.

Herein, as shown in FIG. 5, since harmonic components and cross modulation components are preset in the comparator output, the signal frequency band is broader in output than in input.

Therefore, if the sampling frequency is low, an aliasing distortion occurs, and therefore a relatively high sampling frequency must be selected. Accordingly, an operation frequency of a subsequent level detecting circuit is high, which may be preferred from a viewpoint of hardware scale and power consumption.

Figure 8:
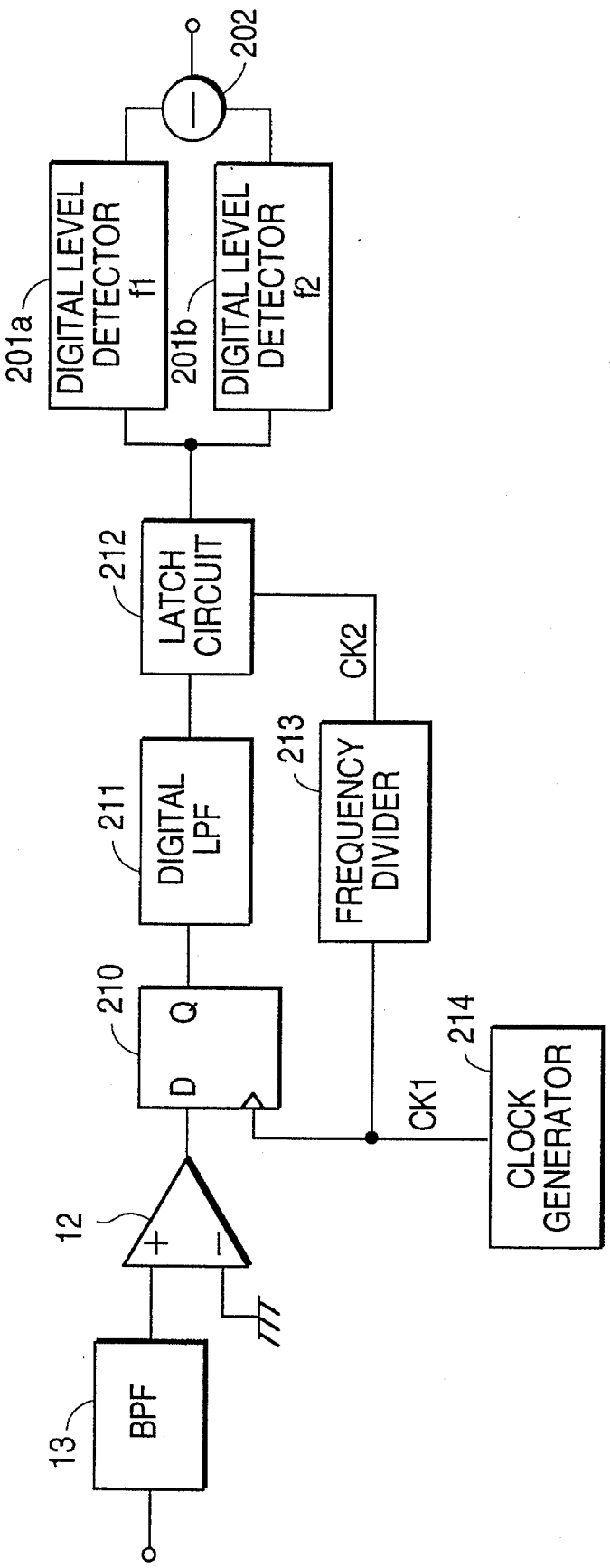
FIG. 8 is a structural diagram of a tracking error detecting circuit in a third embodiment of the invention.

FIG. 8 is a structural diagram of a tracking error detecting circuit in a third embodiment, in which the comparator output is synchronized by using a high frequency clock signal CK1 by D-flip-flop 210, and high frequency components of harmonic components, cross modulation components, and quantizing noise are removed by a digital low pass filter 211, and it is designed to re-sample in a latch circuit 212 at a frequency lower than CK1. In this constitution, sampling at high frequency, effects of the aliasing distortion are smaller, and the effect of quantizing noise is also small because re-sampling is done after filtering. Moreover, by latching at low clock signal, the subsequent process is easy, and it is extremely effective to reduce the hardware scale and save the power consumption.

Figure 9:
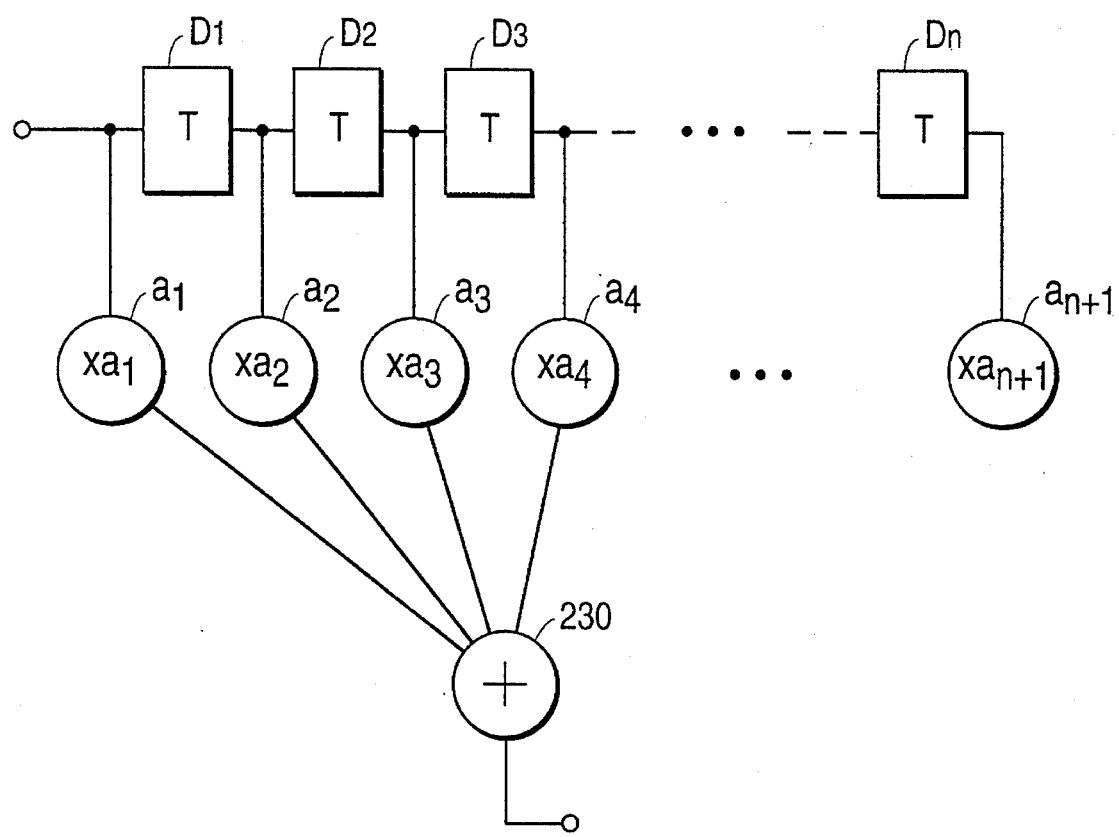
FIG. 9 is a structural diagram of a digital LPF in the third embodiment.

FIG. 9 shows a structural diagram of a digital low pass filter (LPF) 211. D-flip-flops $D_1, D_2, D_3, \ldots, D_n$ are delay elements driven by clock signal CK1, $a_1, a_2, a_3, \ldots, a_n$ are coefficient multipliers, and reference numeral 230 denotes an adder, which is united to compose a finite impulse response (FIR) filter.

Figure 10:
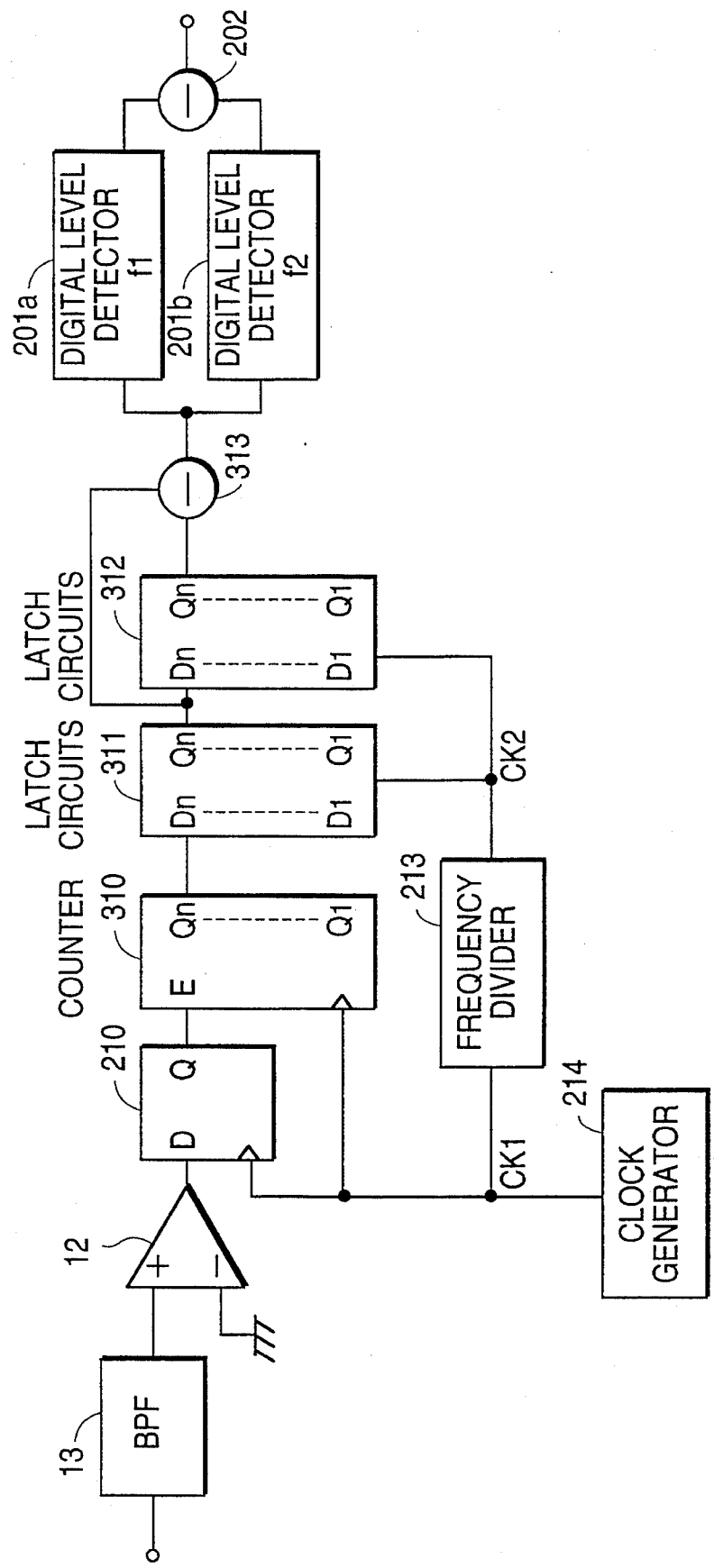
FIG. 10 is a structural diagram of a tracking error detecting circuit in a fourth embodiment of the invention.

FIG. 10 is a structural diagram of a tracking error detecting circuit in a fourth embodiment, in which a counter 310 is counted up by clock signal CK1 when an output of the D-flip-flop 210 for sampling the output of the comparator 12 is H. The clock signal CK1 is divided by a frequency dividing ratio m (m being an integer) in a dividing circuit 213 to become clock signal CK2. An output of a counter 310 is latched in a first latch circuit 311, and an output of the first latch circuit 311 is latched in a second latch circuit 312, respectively by the clock signal CK2. Outputs of the first latch circuit 311 and the second latch circuit 312 are fed into a subtractor 313, where a difference between the outputs is calculated. That is, since an output of the second latch circuit 312 means a value of the counter latched previously, an output of the subtractor 313 means an average of a duration of a period of H and L of the comparator contained in one period of the clock signal CK2. In other words, the output of the comparator is same as the one passing through the LPF by averaging and being converted to a rate of the clock signal CK2. Therefore, in this constitution, too, since the output of the comparator is sampled at high clock signal, it is free from effect of aliasing noise. In addition, by passing through the LPF by averaging and re-sampling to low rate, the subsequent processing is simple, which is greatly effective for saving power consumption and hardware scale.

Figure 11:
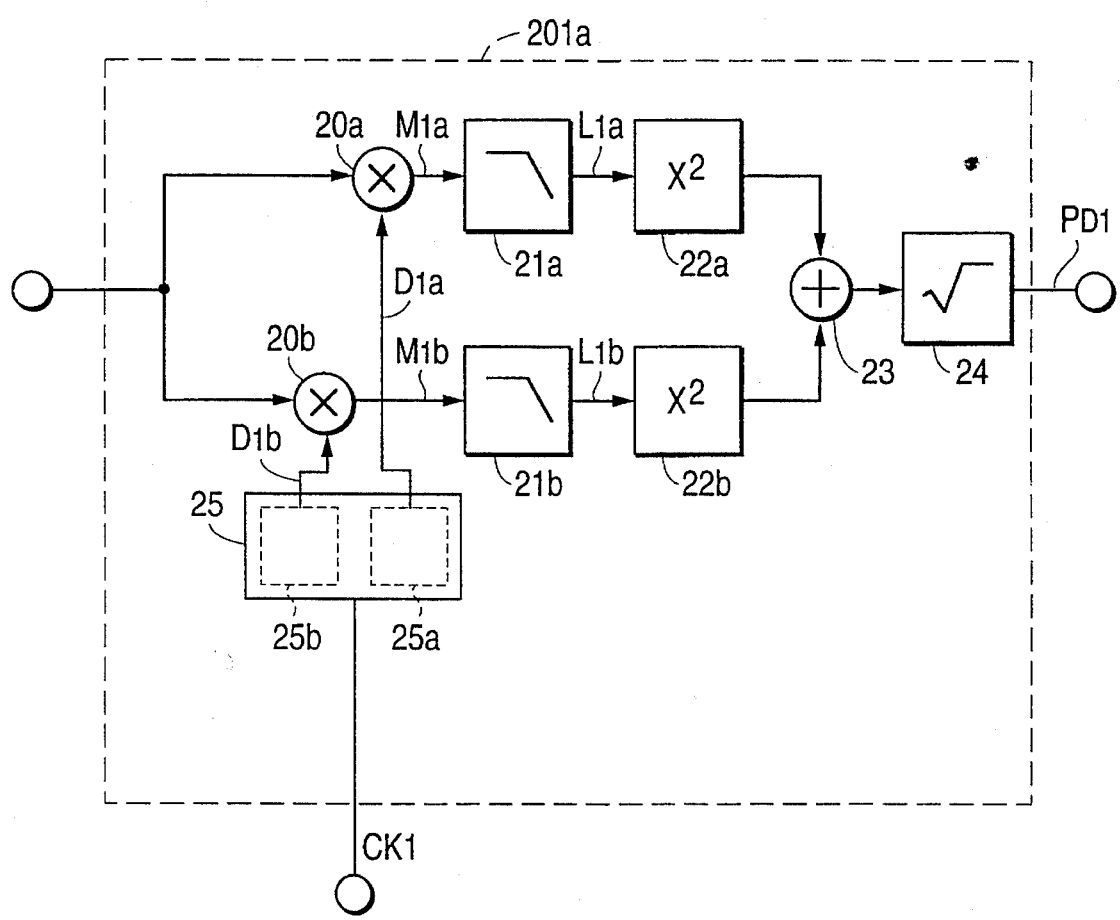
FIG. 11 is a structural diagram showing an example of a digital level detecting circuit.

Referring now to FIG. 11, an operating principle of the digital level detecting circuits of f1 and f2 is explained by relating to an example of detecting a level of f1.

Reference numeral 25 denotes a reference signal generating unit to which the clock signal CK1 for sampling the output of the comparator is connected, and produces a signal at a same frequency $F_1$ as the reproduced pilot frequency $f_1$. More specifically, reference numerals 25a and 25b denotes first and second reference signal generators, which produce signals of two phases at frequency $F_1$ mutually differing in phase by 90 degrees. When clock signals CK1, CK2 are preliminarily selected at an integer multiple of pilot frequency, a constitution of the reference signal generating unit is very simple. For example when CK2 is selected at 4 times the pilot frequency, an output of the first reference signal generator 25a is a simple repetition of 0, 1, 0, −1 . . . , and an output of the second reference signal generator 25b is a simple repetition of 1, 0, −1, 0 . . . , and it is possible to constitute only with a counter and a decoder using CK1 as clock signal. The outputs $D_{1a}$, $D_{1b}$ of the first and second reference signal generators 25a, 25b are expressed as follows.

$$D_{1a} = \sin(2\pi F_1 t)$$

$$D_{1b} = \cos(2\pi F_1 t)$$

Reference numeral 20a denotes a first multiplier, which multiplies an input signal and the output $D_{1a}$, of the first reference signal generator 25a. Reference numeral 20b denotes a second multiplier, which similarly multiplies an input signal and the output $D_{1b}$ of the second reference signal generator 25b. Supposing pilot signal f1 component H1 of input signal to be $$H_1 = A_1 \sin(2\pi f_1 t)$$

(where $A_1$: pilot signal $f_1$ amplitude, t: time), then an output $M_{1a}$, of the first multiplier 20a is $$\begin{aligned} M_{1a} &= H_1 \times D_{1a} \\ &= A_1/2\{\cos(2\pi f_1 t - 2\pi F_1 t) - \\ &\quad \cos(2\pi f_1 t + 2\pi F_1 t)\} \\ &= A_1/2\{\cos(\theta_1) - \cos(2\pi f_1 t + 2\pi F_1 t)\} \end{aligned}$$

Similarly, an output $M_{1b}$ of the second multiplier 20b is $$\begin{aligned} M_{1b} &= H_1 \times D_{1b} \\ &= A_1/2\{\sin(2\pi f_1 t - 2\pi F_1 t) + \\ &\quad \sin(2\pi f_1 t + 2\pi F_1 t)\} \\ &= A_1/2\{\sin(\theta_1) + \sin(2\pi f_1 t + 2\pi F_1 t)\} \end{aligned}$$

where $\theta_1$ shows the phase difference between the reproduced pilot signal $f_1$ and output frequency $F_1$ of the first and second reference signal generators. Herein, when CK2 is selected at an integer multiple of F1 same as above, for example, 4 times, reference signals to be multiplied may be only 1, 0 and −1, so that the first and second multipliers may be very simple.

Reference numeral 21a denotes a first low pass filter, which passes only low frequency signal of the output $M_{1a}$, of the first multiplier 20a. Likewise, reference numeral 21b denotes a second low pass filter, which passes only low frequency range of the output $M_{1b}$ of the second multiplier 20b. Therefore, an output $L_{1a}$ of the first low pass filter 21a passes only a first term of $M_{1a}$, while an output $L_{1b}$ of the second low pass filter 21b passes only a first term of $M_{1b}$. That is, $$L_{1a} = A_1/2\{\cos(\theta_1)\}$$

$$L_{1b} = A_1/2\{\sin(\theta_1)\}$$

Accordingly, outputs of the first and second low pass filters are respectively squared as shown below in square operation circuits 22a, 22b, and summed together in an adder 23 to calculate a root in a root calculating circuit 24, so that a component of ½ of amplitude of the reproduced pilot signal $f_1$ is obtained as an output $P_{D1}$ of a first pilot detection unit 201a.

$$P_{D1} = (L_{1a}^2 + L_{1b}^2)^{1/2}$$
$$= A_1/2$$

As explained in the example of f1, it is the same as the digital level detecting circuit of f2. The individual detected pilot levels are subtracted by the differential circuit 202, and produce a tracking error which is either positive or negative depending on the relative position deviation of the rotating magnetic head and the main track.

In this way, since the error detection circuit of the invention transforms into binary signals of H and L by the comparator, the detection gain is not affected in the reproduction sensitivity of the rotating magnetic head. Besides, by selecting the clock signal at an integer multiple of the pilot frequency, it is possible to digitize easily as in this embodiment.

In this example, the error detection signal after the comparator is digitized, but the capstan control circuit can be also processed digitally by using a CPU or the like.

The constitution of the level detecting circuit is not limited to this embodiment alone, and, for example, a detecting circuit of synchronous detection type may be also used.

Thus, in the embodiments of the invention, the level detecting circuit does not require larger external parts and adjusting elements such as coils and capacitors as in the prior art, and the error detecting circuit after the comparator can be completely composed of digital circuits, so that it is resistant to fluctuations and is easy to form IC.

In addition, expensive parts such as AD (analog/digital) converters are not required, and it is possible to digitize only with the comparator and the D-flip-flop so as to be composed inexpensively.

Application of the pilot signal is not limited to frequency multiplexing by adding to the information signal as mentioned in the foregoing embodiments, but, for example, in the case of digital recording, by modulating the information signal, the density of 1 and 0 may be varied depending on the location, and a pilot component may be composed in a low range. It is not necessary to feed pilot in an entire track.

Furthermore, the pilot frequency may be of the system of sequentially multiplexing four kinds of pilot as in 8 mm format, or multiplexing one kind of the pilot signal in time axis in the track by varying the location, and sampling each pilot level as in digital audio tape (DAT), and the input manner and number of pilot signals are not limited. In particular, when applied in the system of using one kind of pilot as in DAT, only one level detecting circuit is enough.

What is claimed is:

1. A tracking error detecting circuit for a magnetic reproducing apparatus which reproduces an information signal from tracks formed obliquely on a magnetic tape relative to a longitudinal direction of the magnetic tape, the tracks having selectively recorded thereon a pilot signal multiplexed with the information signal, said tracking error detecting circuit comprising:

a rotating magnetic head for scanning the tracks and reproducing the information signal on which the pilot signal is selectively multiplexed to obtain a reproduced signal;

a comparator for comparing a level of the reproduced signal with a specified level and for outputting a binary signal having a pulse width varying according to the level of a pilot signal contained in the reproduced signal; and a level detecting circuit for detecting a level of the pilot signal contained in the reproduced signal from the binary signal output by the comparator.

2. A tracking error detecting circuit for a magnetic reproducing apparatus which reproduces an information signal from tracks formed obliquely on a magnetic tape relative to a longitudinal direction of the magnetic tape, the tracks having selectively recorded thereon a pilot signal multiplexed with the information signal, said tracking error detecting circuit comprising:

a rotating magnetic head for scanning the tracks and reproducing the information signal on which the pilot signal is selectively multiplexed to obtain a reproduced signal;

a comparator for comparing a level of the reproduced signal with a specified level and for outputting a binary signal having a pulse width varying according to the level of a pilot signal contained in the reproduced signal;

a clock generating circuit for generating a clock signal;

a sampling circuit for sampling the binary signal output by the comparator at a sampling rate set by the clock signal and for outputting a corresponding sampled signal; and a level detecting circuit for detecting a level of the pilot signal contained in the reproduced signal from the sampled signal output by the sampling circuit.

3. A tracking error detecting circuit according to claim 2, wherein a frequency of the clock signal is an integer multiple of a frequency of the pilot signal.

4. A tracking error detecting circuit for a magnetic reproducing apparatus which reproduces an information signal from tracks formed obliquely on a magnetic tape relative to a longitudinal direction of the magnetic tape, the tracks having selectively recorded thereon a pilot signal multiplexed with the information signal, said tracking error detecting circuit comprising:

a rotating magnetic head for scanning the tracks and for reproducing the information signal on which the pilot signal is selectively multiplexed to obtain a reproduced signal;

a comparator for comparing a level of the reproduced signal with a specified level and for outputting a binary signal having a pulse width varying according to the level of a pilot signal contained in the reproduced signal;

a clock generating circuit for generating a first clock signal;

a first sampling circuit for sampling the binary signal output by the comparator at a sampling rate set by the first clock signal and for outputting a corresponding first sampled signal;

a low-pass filter for passing a low frequency component of the first sampled signal output by the first sampling circuit to obtain a low-pass filtered signal;

a frequency dividing circuit for frequency-dividing the first clock signal to obtain a second clock signal;

a second sampling circuit for sampling the low-pass filtered signal obtained by the low-pass filter at a sampling rate set by the second clock signal and for outputting a corresponding second sampled signal; and a level detecting circuit for detecting a level of the pilot signal contained in the reproduced signal from the second sampled signal output by the second sampling circuit.

5. A tracking error detecting circuit according to claim 4, wherein a frequency of the second clock signal is an integer multiple of a frequency of the pilot signal.

6. A tracking error detecting circuit for a magnetic reproducing apparatus which reproduces an information signal from tracks formed obliquely on a magnetic tape relative to a longitudinal direction of the magnetic tape, the tracks having selectively recorded thereon a pilot signal multiplexed with the information signal, said tracking error detecting circuit comprising:

- a rotating magnetic head for scanning the tracks and reproducing the information signal on which the pilot signal is selectively multiplexed to obtain a reproduced signal;
- a comparator for comparing a level of the reproduced signal with a specified level and for outputting a binary signal having a pulse width varying according to the level of a pilot signal contained in the reproduced signal;
- a clock generating circuit for generating a first clock signal;
- a sampling circuit for sampling the binary signal output by the comparator at a sampling rate set by the first clock signal and for outputting a sampled signal having high and low levels representing a sampled result;
- a counter for counting up or down clock pulses of the first clock signal during a period in which the sampled signal output by the sampling circuit is the high level;
- a frequency dividing circuit for frequency-dividing the first clock signal to obtain a second clock signal;
- a first latch circuit for latching an output of the counter at a timing set by the second clock signal;
- a second latch circuit for latching an output of the first latch circuit at a timing set by the second clock signal;
- a subtractor for producing a difference signal indicative of a difference between the output of the first latch circuit and an output of the second latch circuit; and
- a level detecting circuit for detecting a level of the pilot signal contained in the reproduced signal from the difference signal produced by the subtractor.

7. A tracking error detecting circuit according to claim 6, wherein a frequency of the second clock signal is an integer multiple of a frequency of the pilot signal.

8. A tracking error detecting circuit according to claim 6, wherein the level detecting circuit comprises:

- first and second reference signal generating circuits for respectively producing from the first clock signal first and second reference signals which differ in phase by 90 degrees from each other;
- first and second multiplying circuits for multiplying the difference signal output by the subtractor with the first and second reference signals, respectively;
- first and second low-pass filters for extracting only low frequency components from outputs of the first and second multiplying circuits, respectively;
- first and second squaring circuits for squaring outputs of the first and second low-pass filters, respectively;
- an adder for adding outputs of the first and second squaring circuits; and
- a root calculating circuit for calculating a root of an output of the adder.

9. A tracking control apparatus for a magnetic reproducing apparatus for reproducing an information signal from tracks formed obliquely on a magnetic tape relative to a longitudinal direction of the magnetic tape, the tracks having selectively recorded thereon a pilot signal multiplexed with the information signal, said tracking control apparatus comprising:

- a rotating magnetic head for scanning the tracks and reproducing the information signal on which the pilot signal is selectively multiplexed to obtain a reproduced signal;
- a comparator for comparing a level of the reproduced signal with a specified level and for outputting a binary signal having a pulse width varying according to the level of a pilot signal contained in the reproduced signal;
- a level detecting circuit for detecting a level of the pilot signal contained in the reproduced signal from the binary signal output by the comparator;
- a tracking error detecting circuit for detecting a tracking error from an output of the level detecting circuit; and,
- a control means responsive to the tracking error signal for maintaining a predetermined relative position between the magnetic head and the track as the track is scanned by the magnetic head.

* * * * *